United States Patent
Bodas et al.

(10) Patent No.: US 10,356,832 B2
(45) Date of Patent: Jul. 16, 2019

(54) INTRODUCTION OF POWERED RELAY FOR DEVICE-TO-DEVICE COMMUNICATION

(71) Applicant: QUALCOMM Incorporated, San Diego, CA (US)

(72) Inventors: Shreeshankar Ravishankar Bodas, West Windsor, NJ (US); Hua Wang, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 14/709,069

(22) Filed: May 11, 2015

(65) Prior Publication Data
US 2016/0338119 A1    Nov. 17, 2016

(51) Int. Cl.
H04W 76/14    (2018.01)
H04W 76/23    (2018.01)
(Continued)

(52) U.S. Cl.
CPC .......... *H04W 76/14* (2018.02); *H04W 72/02* (2013.01); *H04W 72/048* (2013.01);
(Continued)

(58) Field of Classification Search
CPC . H04W 76/023; H04W 88/04; H04W 72/048; H04W 72/02
See application file for complete search history.

(56) References Cited

U.S. PATENT DOCUMENTS 6,301,224 B1 * 10/2001 Rijhsinghani ............ H04B 1/74
370/227
8,332,704 B2 * 12/2012 Chang .................... H04L 1/1854
370/310
(Continued)

FOREIGN PATENT DOCUMENTS

WO    WO-2012177190 A1    12/2012

OTHER PUBLICATIONS

Hasan M., et al., "Distributed Resource Allocation for Relay-Aided Device-to-Device Communication: A Message Passing Approach," 2014, pp. 1-16.
(Continued)

*Primary Examiner* — Alex Skripnikov
(74) *Attorney, Agent, or Firm* — Holland & Hart LLP

(57) ABSTRACT

Methods, systems, and devices are described for wireless communication. Device-to-device (D2D) communications may benefit from the use of a relay facilitating communications between mobile devices. Relays which are not power-limited, such as if the relay is connected to a power grid, may continuously monitor the communication medium. A relay may monitor D2D communications and determine a D2D pair for which to attempt to facilitate communications. The relay may identify a first message from a first mobile device to a second mobile device, and may transmit a second message to the second mobile device. The second message may be transmitted using the same resources as the first message, and may include at least a portion of the first message. The relay may receive a response from the second mobile device and may transmit information about the relay to the second device before facilitating communications between the D2D pair of mobile devices.

52 Claims, 11 Drawing Sheets

(51) Int. Cl.
*H04W 72/02* (2009.01)
*H04W 72/04* (2009.01)
*H04W 88/04* (2009.01)

(52) U.S. Cl.
CPC ............ *H04W 76/23* (2018.02); *H04W 88/04* (2013.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01)

(56) References Cited

U.S. PATENT DOCUMENTS

| | | | | |
|---|---|---|---|---|
| 8,514,751 | B2 * | 8/2013 | Choi | H04B 7/15557 370/278 |
| 8,554,200 | B2 * | 10/2013 | Ribeiro | H04W 72/082 455/422.1 |
| 8,798,528 | B2 * | 8/2014 | Wang | H04B 7/155 455/13.1 |
| 8,830,882 | B2 * | 9/2014 | Kummetz | H04B 7/15535 370/274 |
| 8,942,159 | B2 * | 1/2015 | Chen | H04W 52/0245 370/252 |
| 9,451,524 | B2 * | 9/2016 | Heninwolf | H04W 40/02 |
| 2008/0219214 | A1 | 9/2008 | Chen et al. | |
| 2009/0061767 | A1 * | 3/2009 | Horiuchi | H04B 7/155 455/18 |
| 2009/0075642 | A1 | 3/2009 | Rantapuska et al. | |
| 2009/0325625 | A1 | 12/2009 | Hugl et al. | |
| 2010/0195665 | A1 * | 8/2010 | Jackson | H04L 1/1607 370/464 |
| 2012/0236714 | A1 * | 9/2012 | Aloush | H04L 47/724 370/230 |
| 2012/0243431 | A1 * | 9/2012 | Chen | H04W 72/0406 370/252 |
| 2012/0294228 | A1 * | 11/2012 | Song | H04W 88/04 370/315 |
| 2013/0273956 | A1 | 10/2013 | Peng et al. | |
| 2014/0135019 | A1 | 5/2014 | Jang et al. | |
| 2014/0192705 | A1 * | 7/2014 | Ayadurai | H04B 7/155 370/315 |
| 2014/0323126 | A1 * | 10/2014 | Ro | H04W 8/005 455/434 |
| 2014/0329535 | A1 * | 11/2014 | Sadiq | H04W 76/023 455/452.2 |
| 2014/0369292 | A1 * | 12/2014 | Wu | H04W 72/04 370/329 |
| 2015/0245397 | A1 * | 8/2015 | Sachs | H04W 76/023 455/426.1 |
| 2016/0113036 | A1 | 4/2016 | Stephens et al. | |
| 2016/0227463 | A1 * | 8/2016 | Baligh | H04W 40/02 |
| 2016/0295565 | A1 | 10/2016 | Kim et al. | |
| 2016/0381646 | A1 * | 12/2016 | Li | H04W 74/0816 370/338 |
| 2017/0150503 | A1 * | 5/2017 | Fukuta | H04W 72/0426 |

OTHER PUBLICATIONS

ISA/EP, International Search Report and Written Opinion of the International Searching Authority, Intl. App. No. PCT/US2016/028772, dated Jul. 19, 2016, European Patent Office, Rijswijk, NL, 11 pgs.

\* cited by examiner

INTRODUCTION OF POWERED RELAY FOR DEVICE-TO-DEVICE COMMUNICATION

BACKGROUND

Field of the Disclosure

The following relates generally to wireless communication, and more specifically to introduction of powered relay for device-to-device (D2D) communication.

Description of Related Art

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE). A wireless multiple-access communication system may also, or alternatively, support D2D communication between communication devices (e.g., between UEs). D2D communications may involve wireless communications directly between communication devices (e.g., directly between UEs, without the communications passing through one or more base stations).

D2D communications may sometimes be relayed through one or more intermediary communication devices (e.g., through one or more relays). A relay may take the form of a dedicated relay device or be part of another device, such as a base station or UE. A relay may be an idle mobile device that happens to be in the vicinity of the D2D link. Conserving battery power for the relay may be desired, and may result in two distinct time periods, a relay selection period and a data communication period. The two time periods may be periodic and repeat one after another. The time used for the relay selection period may be short to reduce the overhead associated with determining relay candidates. Further, to reduce power consumption at the relay, the relay selection period may occur infrequently. However, it may be desired to establish a method of communication with a relay which does not need to adhere to the same power requirements as other relays.

SUMMARY

Systems, methods, and apparatuses for introduction of powered relay for device-to-device (D2D) communication are described. A relay may identify a set of D2D messages associated with a set of D2D device pairs. The relay may identify a first message transmitted from a first device directed to a second device using D2D communications on a first set of resources. The relay may attempt to facilitate communications between the first device and the second device based on the first message, or the set of D2D messages, or a combination thereof. The relay may transmit a second message to the second device on the first set of resources upon identifying the transmission of the first message, the second message may include at least a portion of the first message. The relay may receive a response to the second message from the second device. The relay may transmit information associated with the relay device to the second device, the information may include an identification of the relay device, or a modulation and coding scheme (MCS), or a combination thereof. The relay may further facilitate communications between the first device and the second device.

A method of wireless communication is described. The method may include identifying, at a relay device, a first message transmitted from a first device directed to a second device using D2D communications on a first set of resources, transmitting a second message to the second device on the first set of resources upon identifying the transmission of the first message, the second message comprising at least a portion of the first message, and receiving a response to the second message from the second device.

An apparatus for wireless communication is described. The apparatus may include means for identifying, at a relay device, a first message transmitted from a first device directed to a second device using D2D communications on a first set of resources, means for transmitting a second message to the second device on the first set of resources upon identifying the transmission of the first message, the second message comprising at least a portion of the first message, and means for receiving a response to the second message from the second device.

A further apparatus for wireless communication is described. The apparatus may include a processor, memory in electronic communication with the processor, and instructions stored in the memory and operable, when executed by the processor, to cause the apparatus to identify, at a relay device, a first message transmitted from a first device directed to a second device using D2D communications on a first set of resources, transmit a second message to the second device on the first set of resources upon identifying the transmission of the first message, the second message comprising at least a portion of the first message, and receive a response to the second message from the second device.

A non-transitory computer-readable medium storing code for wireless communication is described. The code may include instructions executable to identify, at a relay device, a first message transmitted from a first device directed to a second device using D2D communications on a first set of resources, transmit a second message to the second device on the first set of resources upon identifying the transmission of the first message, the second message comprising at least a portion of the first message, and receive a response to the second message from the second device.

Some examples of the method, apparatuses, or non-transitory computer-readable medium described herein may further include processes, features, means, or instructions for transmitting the second message to the second device at a power level that is equal to a power level used to transmit the first message to the second device. Additionally or alternatively, some examples may include processes, features, means, or instructions for facilitating communications between the first device and the second device.

In some examples of the method, apparatuses, or non-transitory computer-readable medium described herein, facilitating communications comprises at least one of receiving a third message from the first device and retransmitting the third message to the second device, and receiving a fourth message from the second device and retransmitting the fourth message to the first device. Additionally or alternatively, some examples may include processes, features, means, or instructions where facilitating communications between the first device and the second device is initiated by the relay device.

Some examples of the method, apparatuses, or non-transitory computer-readable medium described herein may further include processes, features, means, or instructions for identifying, at the relay device, a plurality of D2D messages associated with a plurality of D2D device pairs, and attempting to facilitate communications between the first device and the second device based at least in part on the first message, or the plurality of D2D messages, or a combination thereof. Additionally or alternatively, some examples may include processes, features, means, or instructions for transmitting information associated with the relay device to the second device, the information comprising an identification of the relay device, or a modulation and coding scheme (MCS), or a combination thereof.

In some examples of the method, apparatuses, or non-transitory computer-readable medium described herein, the relay device is connected to a power grid. Additionally or alternatively, in some examples a D2D communication link is established between the first device and the second device.

In some examples of the method, apparatuses, or non-transitory computer-readable medium described herein, the first message is a request-to-send (RTS) message. Additionally or alternatively, in some examples the response is a clear-to-send (CTS) message.

In some examples of the method, apparatuses, or non-transitory computer-readable medium described herein, the response is an acknowledgment (ACK). Additionally or alternatively, in some examples the first set of resources comprises a frequency channel, or a time slot, or a coding rate, or an MCS, or a combination thereof.

BRIEF DESCRIPTION OF THE DRAWINGS

Aspects of the disclosure are described in reference to the following figures.

DETAILED DESCRIPTION

A relay, such as a power-grid-connected (PGC) relay, may not adhere to the same power requirements as a battery operated relay. As such, the relay may always be on, and may constantly monitor the medium. By constantly monitoring the medium, the relay may reduce or remove the channel measurement phase of the relay selection period. Further, it may be desired for the relay to enhance a device-to-device (D2D) communication link at any point in time, rather than waiting for the relay selection period. By enhancing the D2D communication link, whenever the relay is able to do so, latency may be greatly reduced. Additionally, while battery powered relays may enhance D2D communication links, the battery powered relays may need to be initiated by the transmitter or receiver in the D2D link, so as to limit power consumption of the potentially large number of relay candidates.

When using a relay, such as a PGC relay, not only may the relay constantly monitor the medium, but the relay may initiate enhancement of the D2D link without compromising battery power. In fact, the relay may reduce power consumption at the D2D devices by initiating relay functionality. A relay may monitor communications in its vicinity. For example, the relay may monitor request-to-send (RTS), clear-to-send (CTS), acknowledgment (ACK), or negative acknowledgment (NACK) messages. By monitoring communications, the relay may determine a D2D pair which it could help with communications. Further, if there are multiple D2D pairs in vicinity of the relay, the relay may determine which D2D pair could benefit the most from its assistance.

Aspects of the disclosure are initially described in the context of a wireless communication system. Specific examples are then described for D2D communications. These and other aspects of the disclosure are further illustrated by and described with reference to apparatus diagrams, system diagrams, and flowcharts that relate to introduction of powered relay for D2D communication.

Figure 1:
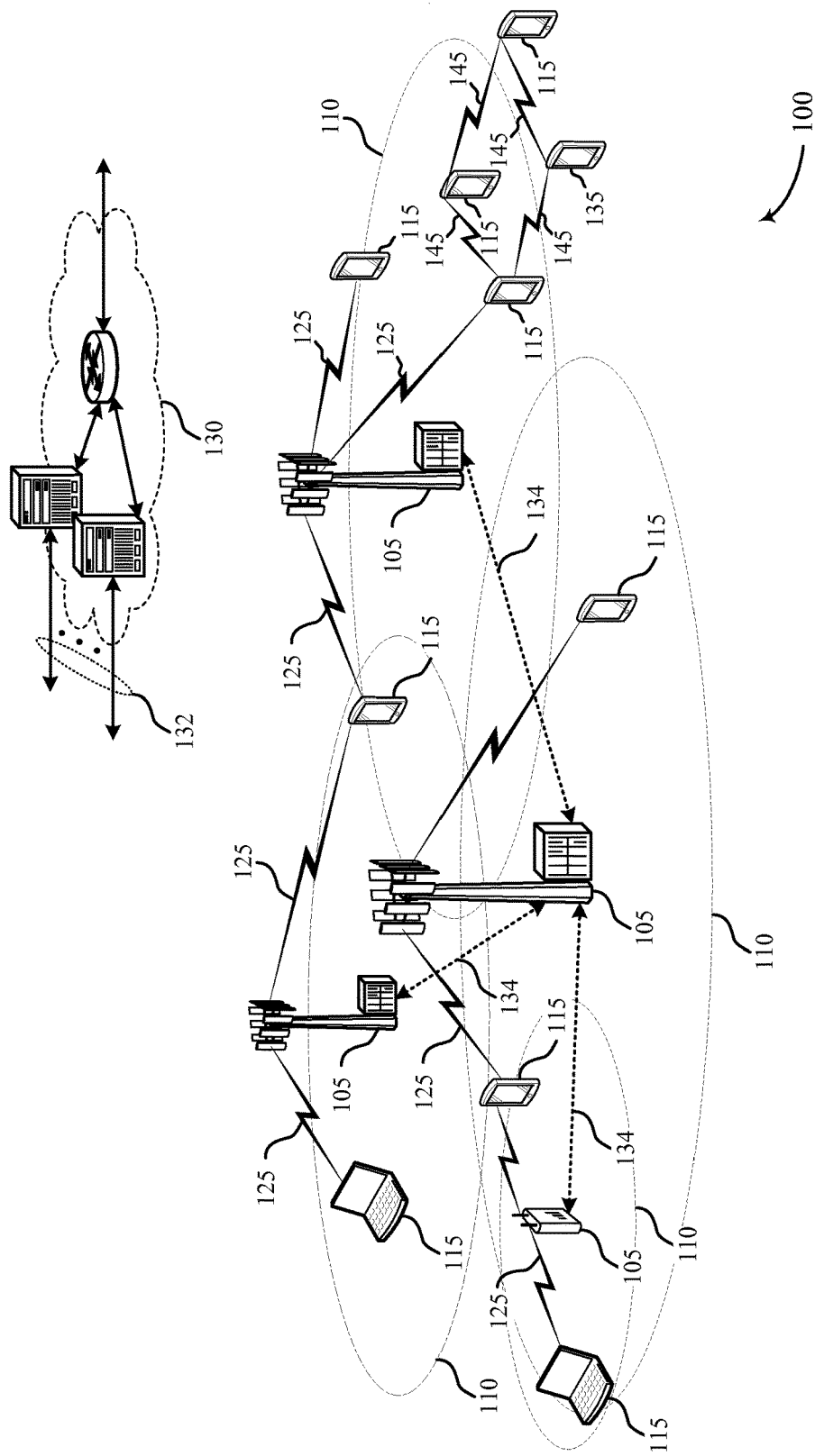
FIG. 1 illustrates an example of a wireless communications system that supports introduction of powered relay for device-to-device (D2D) communication in accordance with various aspects of the present disclosure.

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-advanced (LTE-a) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communication links 145 may also be established between UEs 115, and between UEs 115 and relays 135, in a configuration known as D2D communications. D2D communication directly between two UEs 115 may be referred to as one-hop D2D communication. D2D communication between two UEs 115 through a relay 135 may be referred to as two-hop D2D communication. In some cases, a relay 135 may be an idle UE 115 (or a UE 115 that otherwise has the resources, and capacity, to serve as a relay). In some cases, a relay 135 may be a base station 105, such as a small cell. One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 or a relay 135 facilitates the scheduling of resources for D2D communications. In other cases, D2D communications are carried out independent of a base station 105 or a relay 135.

HARQ may be a method of ensuring that data is received correctly over a wireless communication link 125. hybrid automatic repeat request (HARQ) may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a NACK indicating a failed attempt to decode the information. The chain of transmission, response and retransmission may be referred to as a HARQ process. In some cases, a limited number of HARQ processes may be used for a given communication link 125.

In some cases, a UE 115 (or a base station 105) may be detectable by a central base station 105, but not by other UEs 115 in the coverage area 110 of the central base station 105. For example, one UE 115 may be at one end of the coverage area 110 of the central base station 105 while another UE 115 may be at the other end. Thus, both UEs 115 may communicate with the base station 105, but may not receive the transmissions of the other. This may result in colliding transmissions for the two UEs 115 in a contention based environment (e.g., D2D communications) because the UEs 115 may not refrain from transmitting on top of each other. A UE 115 whose transmissions are not identifiable, but that is within the same coverage area 110 may be known as a hidden node. D2D environments may be supplemented by the exchange of a RTS packet transmitted by a sending UE 115 (or base station 105) and a CTS packet transmitted by the receiving UE 115 (or base station 105). This may alert other devices within range of the sender and receiver not to transmit for the duration of the primary transmission. Thus, RTS/CTS may help mitigate a hidden node problem or prevent collisions.

It may be useful to establish a relay 135 between two UEs 115. Further, it may be beneficial if the relay 135 initiates the relationship, as it may allow the UEs 115 to conserve power or more efficiently communicate (e.g., because the UEs may reduce time spent trying to find a relay 135). As such, a relay 135 may monitor communications (e.g., D2D communications between UEs 115) within a range, or communications detectable by the relay 135. In some cases, the relay 135 may monitor communications between a number of D2D UE 115 pairs. The relay 135 may determine a UE 115 pair for which to facilitate communications. In some cases, the determined UE 115 pair may be a pair of UEs 115 which are exchanging NACKs, or a pair of UEs 115 which the introduction of the relay 135 may benefit. The relay 135 may determine to facilitate communications between a pair of UEs 115 which may benefit the most among the D2D communications which the relay 135 may detect. The relay 135 may detect a first transmission from a first UE 115 of the pair of UEs 115 to a second UE 115 of the pair of UEs 115, and may transmit a message to the second UE 115 which may contain at least some of the information of the first transmission from the first UE 115. The second UE 115 may transmit a response, responsive to the first transmission, which may be received by the relay 135. The relay 135 may transmit information relating to the relay 135 to the second UE 115. The second UE 115 may transmit the information relating to the relay 135 to the first UE 115. The first UE 115 and second UE 115 may communicate through, or using, the relay 135.

Figure 2:
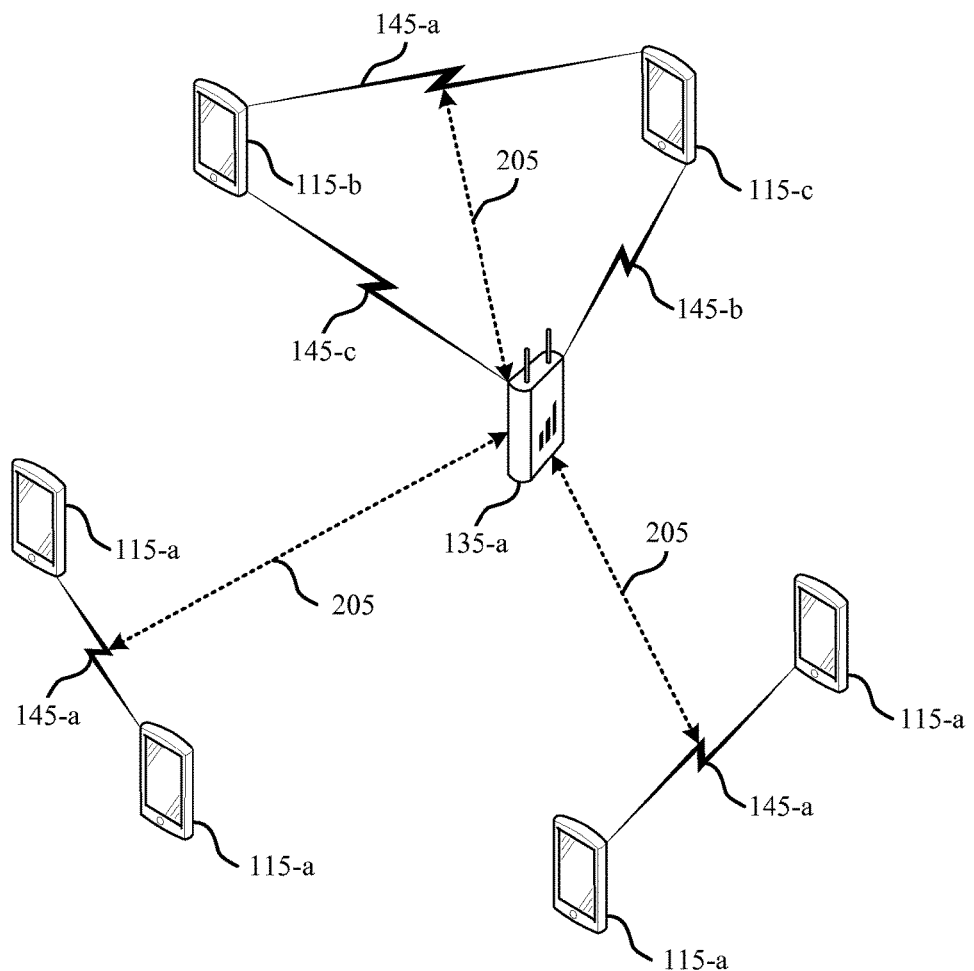
FIG. 2 illustrates an example of a wireless communications subsystem that supports introduction of powered relay for D2D communication in accordance with various aspects of the present disclosure.

FIG. 2 illustrates an example of a wireless communications subsystem 200 for introduction of powered relay for D2D communication in accordance with various aspects of the present disclosure. Wireless communications subsystem 200 may include UEs 115 which may be examples of a UE 115 as described with reference to FIG. 1. Wireless communications subsystem 200 may include relay 135-a, which may be an example of a UE 115, a base station 105, or a relay 135 as described with reference to FIG. 1.

A relay 135-a may monitor 205 communications 145-a between UEs 115. The relay 135-a may be a PGC relay, or may have lenient power restrictions. For example, the relay 135-a may be able to freely, or constantly, monitor communication links 145-a. The UEs 115 may have a link established with another UE 115 and may be communicating using D2D communications. The relay 135-a may monitor 205 communications 145-a which the relay 135-a can detect, or are within a range. In some cases, the relay 135-a may monitor 205 a number of communications 145-a, or a number of links. The relay 135-a, or another network device, may determine a link for which to attempt to facilitate communications, or help. The relay 135-a may help a single link, or multiple links. Determining which link to help may be based on a signal strength, the messages exchanged, or other factors. For example, the relay 135-a may monitor 205 RTS, CTS, ACK, and NACK messages. A link with a greater number of NACKs may be an ideal link to attempt to help, as messages are not always properly transmitted between the UEs 115.

The relay 135-a may determine to help the link between UE 115-b and UE 115-c. The relay 135-a may monitor 205 communications 145-a between UE 115-b and UE 115-c. The relay 135-a may identify a message, such as a message transmitted from a first UE 115-b directed to a second UE 115-c. In some cases, the message may be an RTS. The relay 135-a may transmit a message to the second UE 115-c. In some cases, the message transmitted from the relay 135-a to the second UE 115-c may contain some or all of the information contained in the message or characteristics of the message transmitted from the first UE 115-b and directed to the second UE 115-c. Further, the message transmitted from the relay 135-a may be transmitted on the same set of resources (e.g., frequency channel, time slot, coding rate, modulation and coding scheme (MCS), etc.) as the message transmitted from the first UE 115-*b*. For example, the relay 135-*a* may transmit an RTS to the second UE 115-*c*. In some cases, the message transmitted from the relay 135-*a* to the second UE 115-*c* may be transmitted using a power which is equal to, or similar to, the power used when transmitting the message from the first UE 115-*b* to the second UE 115-*c*. At times, the message transmitted by the first UE 115-*b* and the message transmitted by the relay 135-*a*, may be received at approximately the same time, or a similar time, by the second UE 115-*c*.

The second UE 115-*c* may transmit a response, which may be responsive to at least one of the message transmitted from the first UE 115-*b* and the message transmitted from the relay 135-*a*. If the relay 135-*a* is located closer to the second UE 115-*c* than is the first UE 115-*b*, the message from the relay 135-*a* may be received at the second UE 115-*c* with a higher power than the message from the first UE 115-*b*. At times, the power of the response may be inversely proportional to the power of the received message(s), such as based on an inverse power echo mechanism. As such, the power of the response transmitted from the second UE 115-*c* may be based on the power of the message received from the relay 135-*a*. The response may be received by the relay 135-*a*. At times, the first UE 115-*b* may not receive the response from the second UE 115-*c* (e.g., due to higher pathloss or insufficient transmit power). The response may include a CTS or ACK. If the response is received at the first UE 115-*b*, the first UE 115-*b* and the second UE 115-*c* may continue D2D communications, such as without use of the relay 135-*a*. Further, if neither the first UE 115-*b* nor the relay 135-*a* receive the response, the first UE 115-*b* and the second UE 115-*c* may continue D2D communications, such as without use of the relay 135-*a*.

If the relay 135-*a* receives the response from the second UE 115-*c*, the relay 135-*a* may transmit data to be received at the second UE 115-*c*. The data may include information associated with the relay 135-*a*, or use of the relay 135-*a*, such as an identification (e.g., 16 bit identifier, 64 bit identifier, etc.) of the relay, a coding rate, a MCS, or other information associated with the relay 135-*a*, or use of the relay 135-*a*. The data may be coded at a low rate (e.g., 1/10 or less) to allow reliable decoding. In some cases, decoding overhead may be reduced if the relay 135-*a* uses the same MCS for transmission of the data as the first UE 115-*b* previously used for transmissions to the second UE 115-*c*.

The second UE 115-*c* may detect if the data was received from the first UE 115-*b* or the relay 135-*a*. If the data is properly received at the second UE 115-*c* from the relay 135-*a*, the second UE 115-*c* may detect the data and acknowledge reception (e.g., transmit an ACK to the relay 135-*a*). Otherwise, the second UE 115-*c* may transmit a NACK to the relay 135-*a* or continue normal D2D communications with the first UE 115-*b*. ACKs or NACKs may have different bit patterns, such as depending on whether it is transmitted to the first UE 115-*b* or the relay 135-*a*. The relay 135-*a* may continue to mimic portions of transmissions between the first UE 115-*b* and the second UE 115-*c* as described above, or other D2D pairs, until the relay 135-*a* receives an ACK from a UE 115, such as the second UE 115-*c*.

The second UE 115-*c* may transmit a message to the first UE 115-*b*. The message may be an RTS. The message may further include information relating to the relay 135-*a*, such as information needed for the D2D pair to operate through the relay 135-*a*. As discussed above, the information may include an identification of the relay 135-*a*, an MCS, etc. The message transmitted from the second UE 115-*c* may inform the first UE 115-*b* of the presence of the relay 135-*a*. At times, higher-layer authentication may be performed, allowing the D2D pair to operate using the relay 135-*a*.

The relay 135-*a* may facilitate communications between the first UE 115-*b* and the second UE 115-*c*, such as using communication link 145-*b* and communication link 145-*c*. Facilitating communications may include the relay 135-*a* interacting with both the first UE 115-*b* and the second UE 115-*c*. For example, the first UE 115-*b* may transmit a message intended for the second UE 115-*c*, to the relay 135-*a*. The relay 135-*a* may then transmit the message from the first UE 115-*b* to the second UE 115-*c*. Further, the second UE 115-*c* may transmit a message intended for the first UE 115-*b* to the relay 135-*a*. The relay 135-*a* may then transmit the message from the second UE 115-*c* to the first UE 115-*b*.

The relay 135-*a* may facilitate communications for a number of D2D pairs, such as simultaneously or subsequently. Further, the relay 135-*a* may continue to monitor other D2D links 145-*a* while facilitating communications for a D2D link. At times, the relay 135-*a* may transition to facilitating communications for another D2D pair, such as if it is determined that the other D2D pair would benefit from the relay 135-*a* facilitating communications more than the currently assisted D2D pair. In some cases, the relay 135-*a* may communicate with a base station 105 or another relay 135. Further, the relay 135-*a* may coordinate communications between the D2D pair based on information obtained from the base station.

Figure 3:
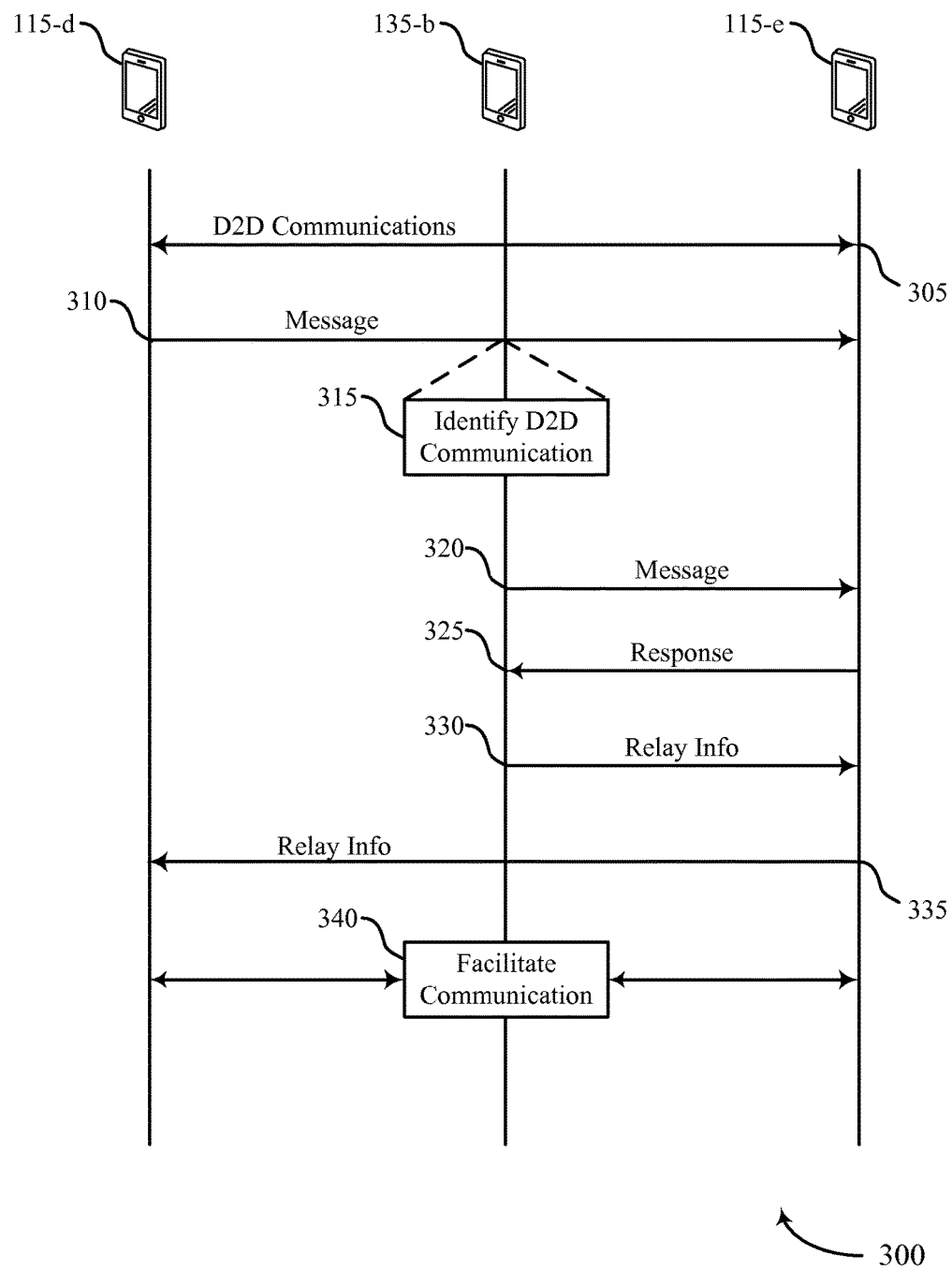
FIG. 3 illustrates an example of a process flow that supports introduction of powered relay for D2D communication in accordance with various aspects of the present disclosure.

FIG. 3 illustrates an example of a process flow 300 for introduction of powered relay for D2D communication in accordance with various aspects of the present disclosure. Process flow 300 may include UE 115-*d* and UE 115-*e*, which may be examples of UEs 115 described with reference to FIGS. 1-2. Process flow 300 may include relay 135-*b*, which may be an example of a UE 115, a base station 105, or a relay 135 described with reference to FIGS. 1-2.

At block 305, a D2D communication link is established between a first device 115-*d* and a second device 115-*e*.

At block 310, the first device 115-*d* may transmit a first message to the second device 115-*e*. In some examples the first message is an RTS message.

At block 315, the relay 135-*b* may identify, at a relay device, the first message transmitted from the first device 115-*d* directed to the second device 115-*e* using D2D communications on a first set of resources. The relay 135-*b* may identify, at the relay device, a set of D2D messages associated with a set of D2D device pairs. The relay 135-*b* may attempt to facilitate communications between the first device 115-*d* and the second device 115-*e* based on the first message, or the set of D2D messages, or a combination thereof. In some examples the relay device 135-*b* is connected to a power grid. In some examples the first set of resources comprises a frequency channel, or a time slot, or a coding rate, or a MCS, or a combination thereof.

At block 320, the relay 135-*b* may transmit a second message to the second device 115-*e* on the first set of resources upon identifying the transmission of the first message, the second message including at least a portion of the first message. The relay 135-*b* may transmit the second message to the second device 115-*e* at a power level that may be equal to a power level used to transmit the first message to the second device 115-*e*.

At block 325, the relay 135-*b* may receive a response to the second message from the second device 115-*e*. In some examples the response is a CTS message. In some examples the response is an ACK.

At block 330, the relay 135-*b* may transmit information associated with the relay device 135-*b* to the second device 115-*e*, the information including an identification of the relay device 135-*b*, or a modulation and coding scheme (MCS), or a combination thereof.

At block 335, the second device 115-*e* may transmit the information associated with the relay 135-*b* to the first device 115-*d*.

At block 340, the relay 135-*b* may facilitate communications between the first device 115-*d* and the second device 115-*e*. In some examples facilitating communications comprises: at least one of receiving a third message from the first device 115-*d* and retransmitting the third message to the second device 115-*e* and receiving a fourth message from the second device 115-*e* and retransmitting the fourth message to the first device 115-*d*. Facilitating communications between the first device 115-*d* and the second device 115-*e* may be initiated by the relay device 135-*b*.

Figure 4:
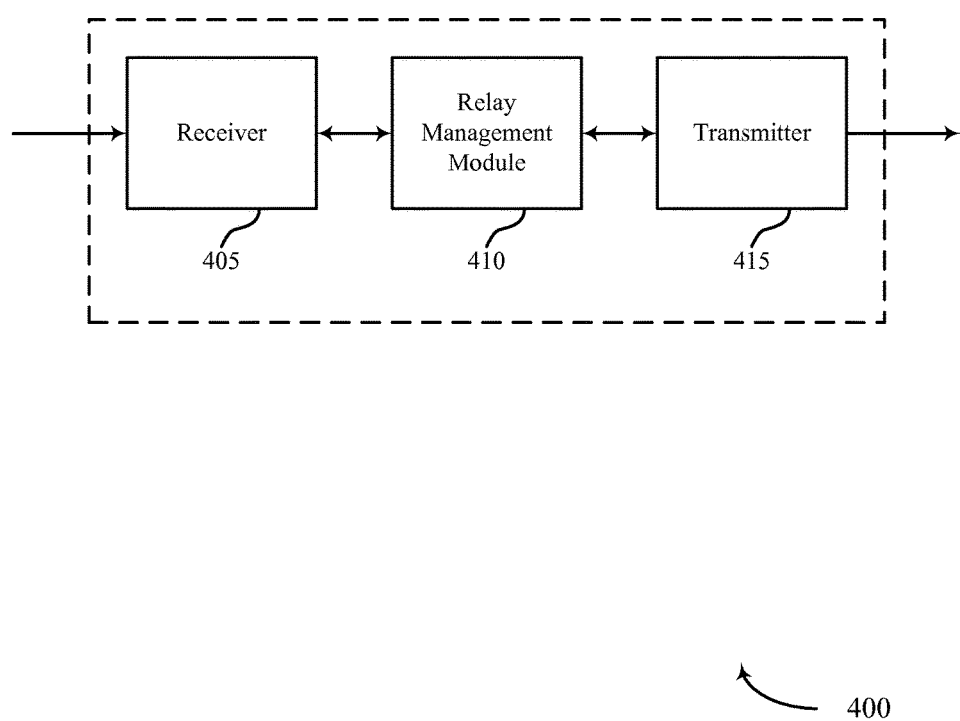
FIGS. 4-6 show block diagrams of a wireless device that supports introduction of powered relay for D2D communication in accordance with various aspects of the present disclosure.

FIG. 4 shows a block diagram of a wireless device 400 configured for introduction of powered relay for D2D communication in accordance with various aspects of the present disclosure. Wireless device 400 may be an example of aspects of a UE 115, a relay 135, or a base station 105 described with reference to FIGS. 1-3. Wireless device 400 may include a receiver 405, a relay management module 410, or a transmitter 415. Wireless device 400 may also include a processor. Each of these components may be in communication with each other.

The receiver 405 may receive information such as packets, user data, or control information associated with various information channels (e.g., control channels, data channels, and information related to introduction of powered relay for D2D communication, etc.). Information may be passed on to the relay management module 410, and to other components of wireless device 400.

The relay management module 410 may identify, at a relay device, a first message transmitted from a first device directed to a second device using D2D communications on a first set of resources, transmit a second message to the second device on the first set of resources upon identifying the transmission of the first message, the second message comprising at least a portion of the first message, and receive a response to the second message from the second device.

The transmitter 415 may transmit signals received from other components of wireless device 400. In some examples, the transmitter 415 may be collocated with the receiver 405 in a transceiver module. The transmitter 415 may include a single antenna, or it may include a plurality of antennas.

Figure 5:
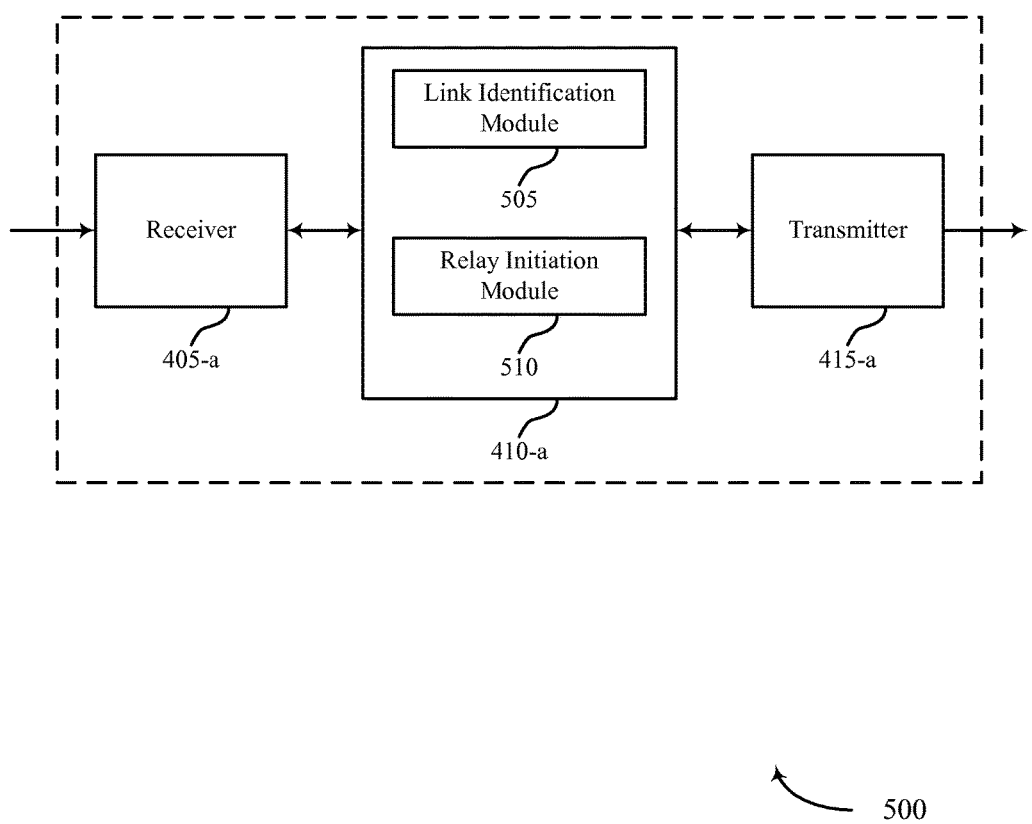

FIG. 5 shows a block diagram of a wireless device 500 for introduction of powered relay for D2D communication in accordance with various aspects of the present disclosure. Wireless device 500 may be an example of aspects of a wireless device 400, a UE 115, a relay 135, or a base station 105 described with reference to FIGS. 1-4. Wireless device 500 may include a receiver 405-*a*, a relay management module 410-*a*, or a transmitter 415-*a*. Wireless device 500 may also include a processor. Each of these components may be in communication with each other. The relay management module 410-*a* may also include a link identification module 505, and a relay initiation module 510.

The receiver 405-*a* may receive information which may be passed on to relay management module 410-*a*, and to other components of wireless device 500. The relay management module 410-*a* may perform the operations described with reference to FIG. 4. The transmitter 415-*a* may transmit signals received from other components of wireless device 500.

The link identification module 505 may identify, at a relay device, a first message transmitted from a first device directed to a second device using D2D communications on a first set of resources as described with reference to FIGS. 2-3. The link identification module 505 may also identify, at the relay device, a plurality of D2D messages associated with a plurality of D2D device pairs. In some examples, a D2D communication link may be established between the first device and the second device. In some examples, the first message may be a RTS message.

The relay initiation module 510 may transmit a second message to the second device on the first set of resources upon identifying the transmission of the first message, the second message comprising at least a portion of the first message as described with reference to FIGS. 2-3. The relay initiation module 510 may also receive a response to the second message from the second device. The relay initiation module 510 may also transmit the second message to the second device at a power level that is equal to a power level used to transmit the first message to the second device. The relay initiation module 510 may also transmit information associated with the relay device to the second device, the information comprising an identification of the relay device, or a MCS, or a combination thereof. In some examples, the relay device may be connected to a power grid. In some examples, the response may be a CTS message. In some examples, the response may be an ACK. In some examples, the first set of resources comprises a frequency channel, or a time slot, or a coding rate, or a MCS, or a combination thereof.

Figure 6:
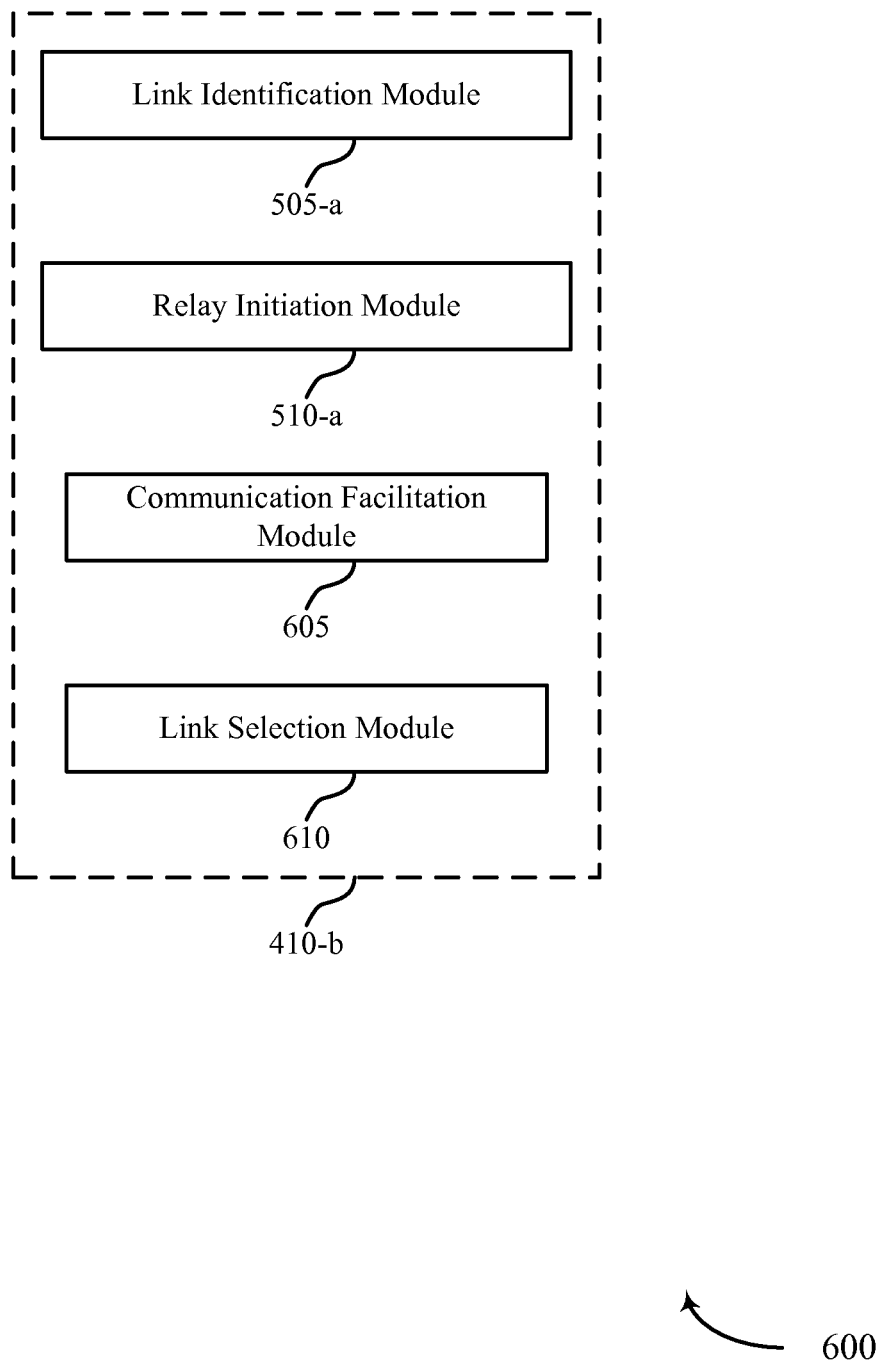

FIG. 6 shows a block diagram 600 of a relay management module 410-*b* which may be a component of a wireless device 400 or a wireless device 500 for introduction of powered relay for D2D communication in accordance with various aspects of the present disclosure. The relay management module 410-*b* may be an example of aspects of a relay management module 410 described with reference to FIGS. 4-5. The relay management module 410-*b* may include a link identification module 505-*a*, and a relay initiation module 510-*a*. Each of these modules may perform the functions described with reference to FIG. 5. The relay management module 410-*b* may also include a communication facilitation module 605, and a link selection module 610.

The communication facilitation module 605 may facilitate communications between the first device and the second device as described with reference to FIGS. 2-3. In some examples, facilitating communications comprises at least one of receiving a third message from the first device and retransmitting the third message to the second device. The communication facilitation module 605 may also receive a fourth message from the second device and retransmitting the fourth message to the first device. The communication facilitation module 605 may also facilitate communications between the first device and the second device is initiated by the relay device.

The link selection module 610 may attempt to facilitate communications between the first device and the second device based at least in part on the first message, or the plurality of D2D messages, or a combination thereof as described with reference to FIGS. 2-3.

Figure 7:
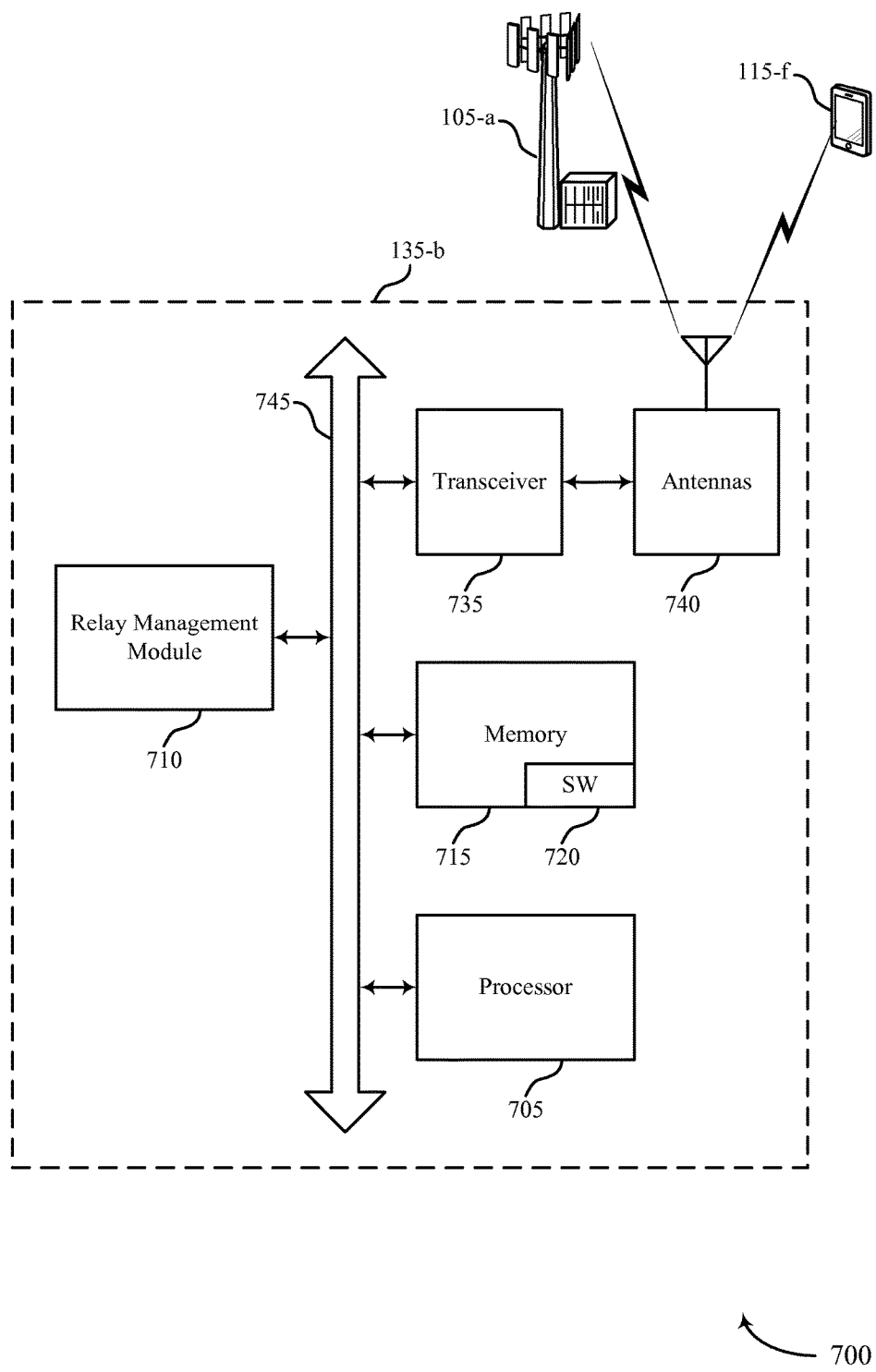
FIG. 7 illustrates a block diagram of a system including a user equipment (UE) that supports introduction of powered relay for D2D communication in accordance with various aspects of the present disclosure.

FIG. 7 shows a diagram of a system 700 including a relay 135 configured for introduction of powered relay for D2D communication in accordance with various aspects of the present disclosure. System 700 may include relay 135-*b*, which may be an example of a wireless device 400, a wireless device 500, a UE 115, a relay 135, or a base station 105 described with reference to FIGS. 1-6. Relay 135-*b* may include a relay management module 710, which may be an example of a relay management module 410 described with reference to FIGS. 4-6. Relay 135-*b* may also include components for bi-directional voice and data communications including components for transmitting communications and components for receiving communications. For example, relay 135-*b* may communicate bi-directionally with base station 105-*a* or UE 115-*f*.

Relay 135-*b* may also include a processor 705, and memory 715 (including software (SW)) 720, a transceiver 735, and one or more antenna(s) 740, each of which may communicate, directly or indirectly, with one another (e.g., via buses 745). The transceiver 735 may communicate bi-directionally, via the antenna(s) 740 or wired or wireless links, with one or more networks, as described above. For example, the transceiver 735 may communicate bi-directionally with a base station 105 or a UE 115. The transceiver 735 may include a modem to modulate the packets and provide the modulated packets to the antenna(s) 740 for transmission, and to demodulate packets received from the antenna(s) 740. While relay 135-*b* may include a single antenna 740, relay 135-*b* may also have multiple antennas 740 capable of concurrently transmitting or receiving multiple wireless transmissions.

The memory 715 may include random access memory (RAM) and read only memory (ROM). The memory 715 may store computer-readable, computer-executable software/firmware code 720 including instructions that, when executed, cause the processor 705 to perform various functions described herein (e.g., introduction of powered relay for D2D communication, etc.). Alternatively, the software/firmware code 720 may not be directly executable by the processor 705 but cause a computer (e.g., when compiled and executed) to perform functions described herein. The processor 705 may include an intelligent hardware device, (e.g., a central processing unit (CPU), a microcontroller, an application specific integrated circuit (ASIC), etc.)

The components of wireless device 400, wireless device 500, relay management module 410, and relay management module 710 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 8:
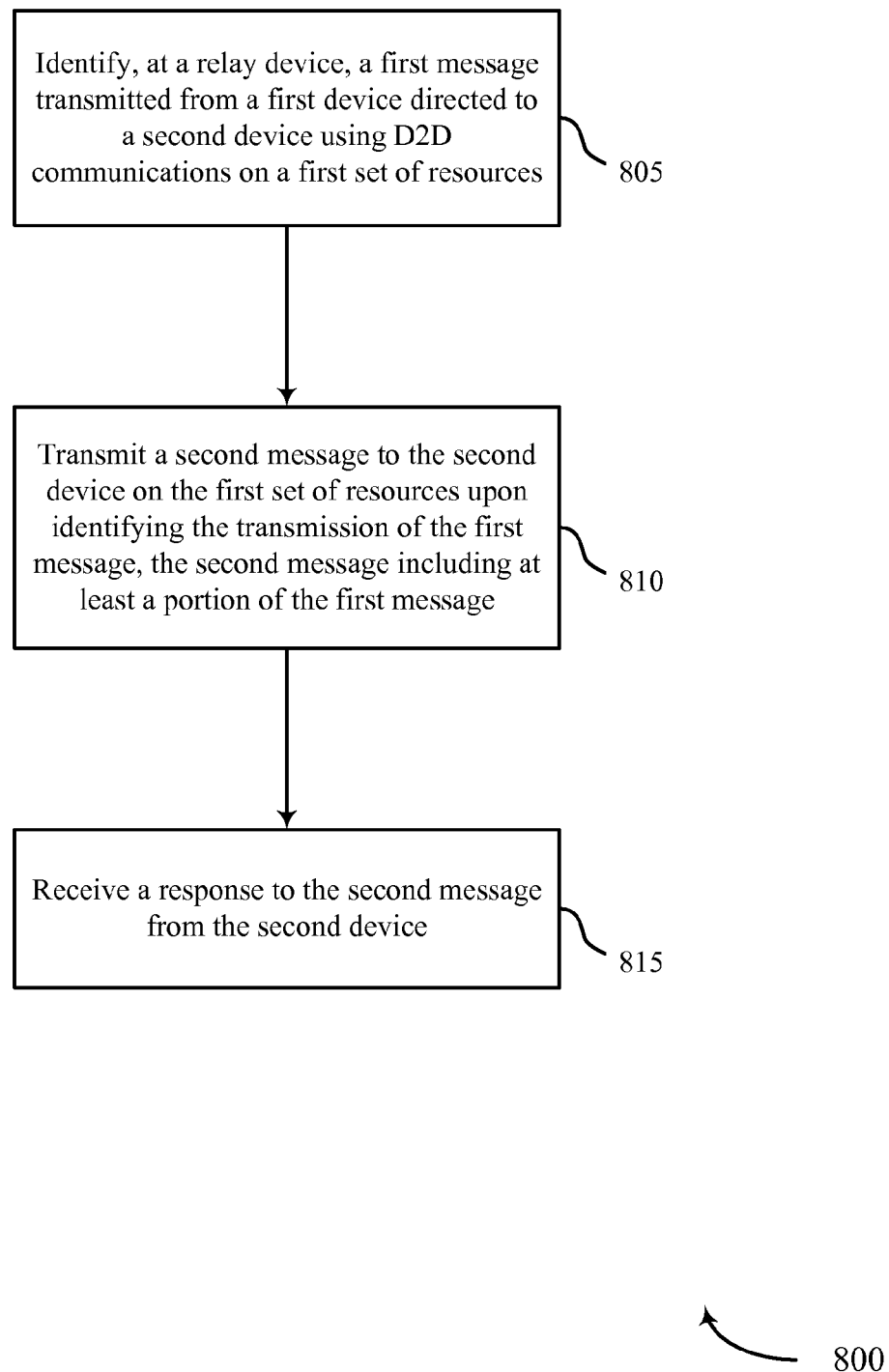
FIGS. 8-11 illustrate methods for introduction of powered relay for D2D communication in accordance with various aspects of the present disclosure.

FIG. 8 shows a flowchart illustrating a method 800 for introduction of powered relay for D2D communication in accordance with various aspects of the present disclosure. The operations of method 800 may be implemented by a relay 135 or its components as described with reference to FIGS. 1-7. For example, the operations of method 800 may be performed by the relay management module 410 as described with reference to FIGS. 4-7. In some examples, a relay 135 may execute a set of codes to control the functional elements of the relay 135 to perform the functions described below. Additionally or alternatively, the relay 135 may perform aspects the functions described below using special-purpose hardware.

At block 805, the relay 135 may identify, at a relay device, a first message transmitted from a first device directed to a second device using D2D communications on a first set of resources as described with reference to FIGS. 2-3. In certain examples, the operations of block 805 may be performed by the link identification module 505 as described with reference to FIGS. 5 and 6.

At block 810, the relay 135 may transmit a second message to the second device on the first set of resources upon identifying the transmission of the first message, the second message comprising at least a portion of the first message as described with reference to FIGS. 2-3. In certain examples, the operations of block 810 may be performed by the relay initiation module 510 as described with reference to FIGS. 5 and 6.

At block 815, the relay 135 may receive a response to the second message from the second device as described with reference to FIGS. 2-3. In certain examples, the operations of block 815 may be performed by the relay initiation module 510 as described with reference to FIGS. 5 and 6.

Figure 9:
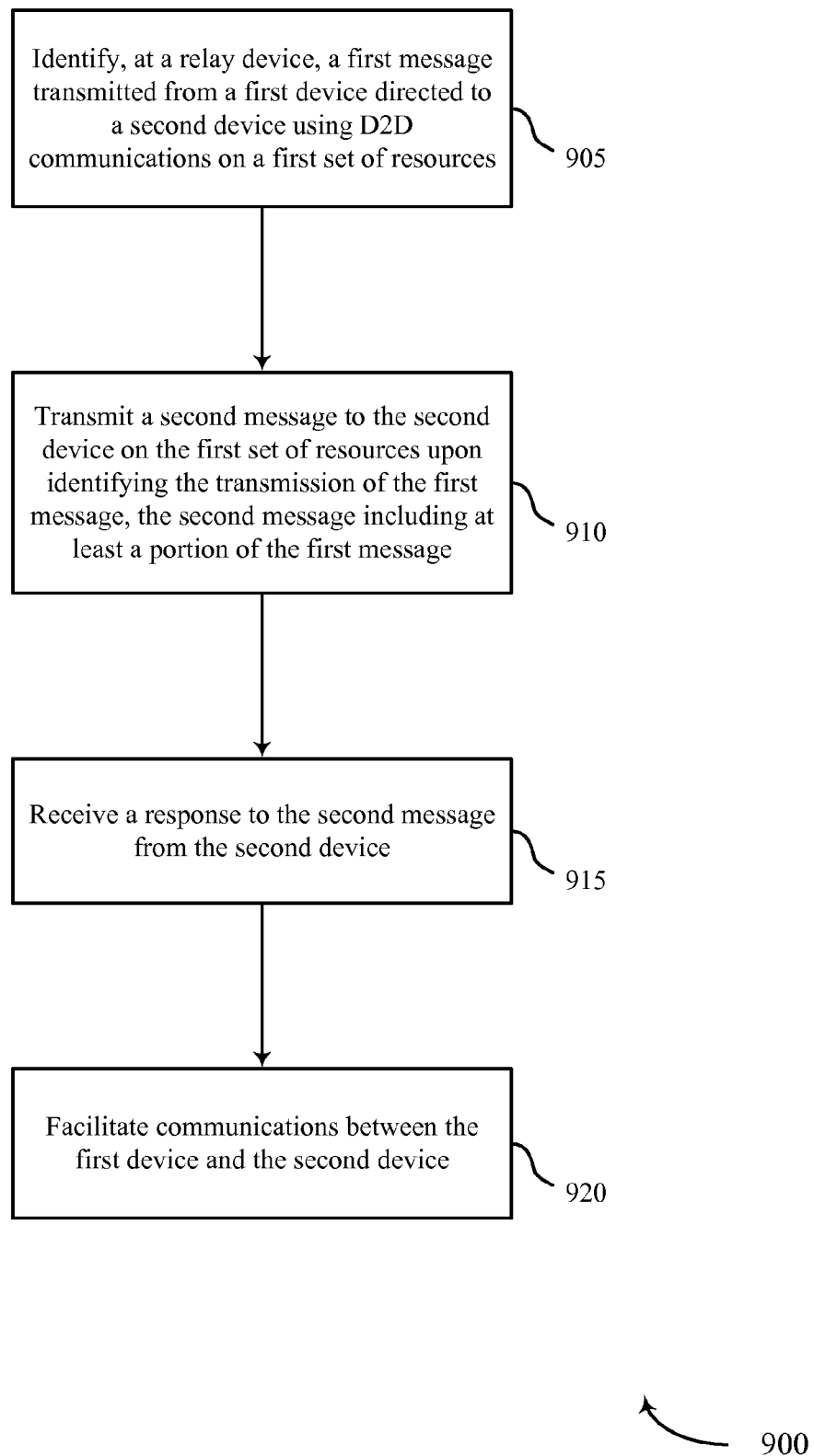

FIG. 9 shows a flowchart illustrating a method 900 for introduction of powered relay for D2D communication in accordance with various aspects of the present disclosure. The operations of method 900 may be implemented by a relay 135 or its components as described with reference to FIGS. 1-7. For example, the operations of method 900 may be performed by the relay management module 410 as described with reference to FIGS. 4-7. In some examples, a relay 135 may execute a set of codes to control the functional elements of the relay 135 to perform the functions described below. Additionally or alternatively, the relay 135 may perform aspects the functions described below using special-purpose hardware. The method 900 may also incorporate aspects of method 800 of FIG. 8.

At block 905, the relay 135 may identify, at a relay device, a first message transmitted from a first device directed to a second device using D2D communications on a first set of resources as described with reference to FIGS. 2-3. In certain examples, the operations of block 905 may be performed by the link identification module 505 as described with reference to FIGS. 5 and 6.

At block 910, the relay 135 may transmit a second message to the second device on the first set of resources upon identifying the transmission of the first message, the second message comprising at least a portion of the first message as described with reference to FIGS. 2-3. In certain examples, the operations of block 910 may be performed by the relay initiation module 510 as described with reference to FIGS. 5 and 6.

At block 915, the relay 135 may receive a response to the second message from the second device as described with reference to FIGS. 2-3. In certain examples, the operations of block 915 may be performed by the relay initiation module 510 as described with reference to FIGS. 5 and 6.

At block 920, the relay 135 may facilitate communications between the first device and the second device as described with reference to FIGS. 2-3. In certain examples, the operations of block 920 may be performed by the communication facilitation module 605 as described with reference to FIG. 6.

Figure 10:
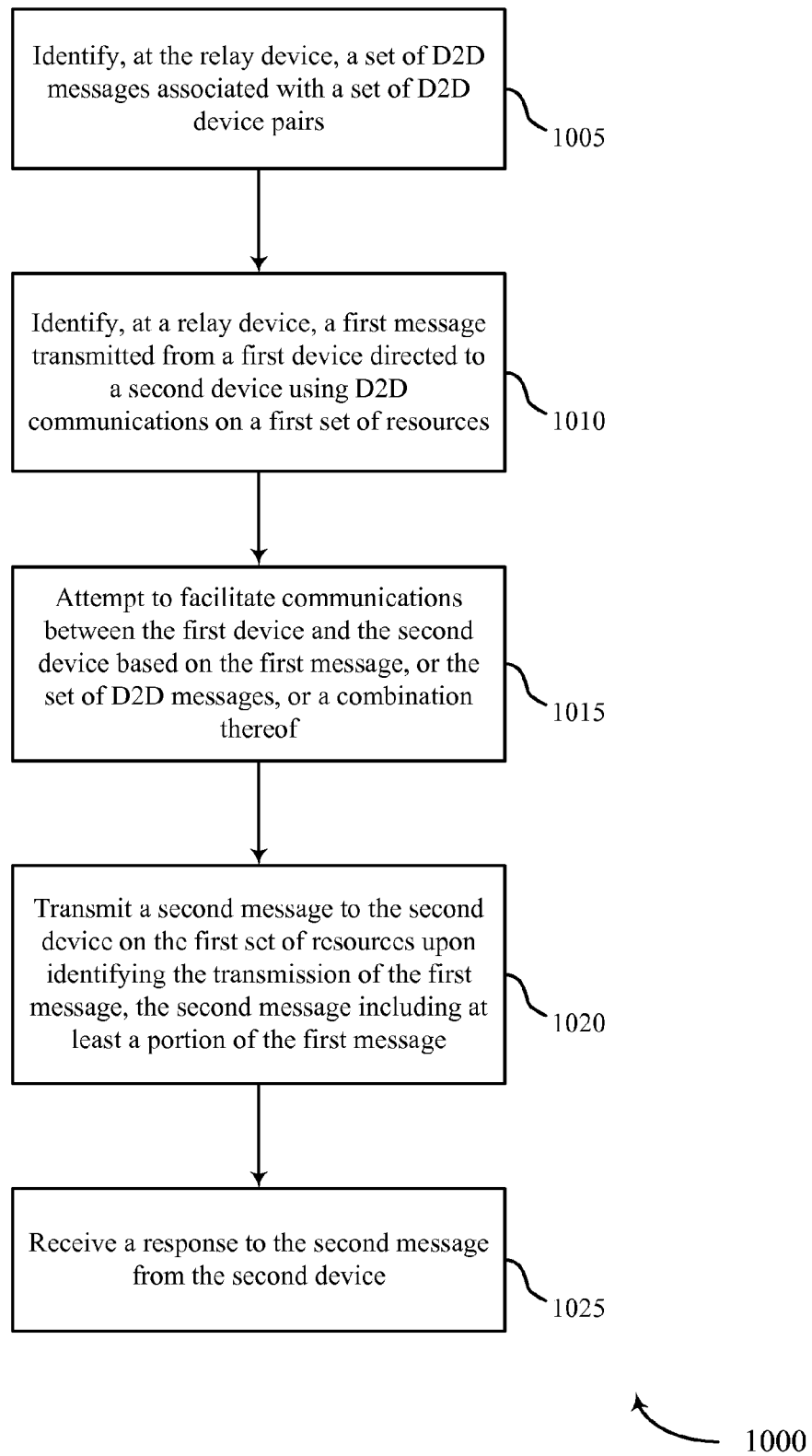

FIG. 10 shows a flowchart illustrating a method 1000 for introduction of powered relay for D2D communication in accordance with various aspects of the present disclosure. The operations of method 1000 may be implemented by a relay 135 or its components as described with reference to FIGS. 1-7. For example, the operations of method 1000 may be performed by the relay management module 410 as described with reference to FIGS. 4-7. In some examples, a relay 135 may execute a set of codes to control the functional elements of the relay 135 to perform the functions described below. Additionally or alternatively, the relay 135 may perform aspects the functions described below using special-purpose hardware. The method 1000 may also incorporate aspects of methods 800, and 900 of FIGS. 8-9.

At block 1005, the relay 135 may identify, at the relay device, a plurality of D2D messages associated with a plurality of D2D device pairs as described with reference to FIGS. 2-3. In certain examples, the operations of block 1005 may be performed by the link identification module 505 as described with reference to FIGS. 5 and 6.

At block 1010, the relay 135 may identify, at a relay device, a first message transmitted from a first device directed to a second device using D2D communications on a first set of resources as described with reference to FIGS. 2-3. In certain examples, the operations of block 1010 may be performed by the link identification module 505 as described with reference to FIGS. 5 and 6.

At block 1015, the relay 135 may attempt to facilitate communications between the first device and the second device based at least in part on the first message, or the plurality of D2D messages, or a combination thereof as described with reference to FIGS. 2-3. In certain examples, the operations of block 1015 may be performed by the link selection module 610 as described with reference to FIG. 6.

At block 1020, the relay 135 may transmit a second message to the second device on the first set of resources upon identifying the transmission of the first message, the second message comprising at least a portion of the first message as described with reference to FIGS. 2-3. In certain examples, the operations of block 1020 may be performed by the relay initiation module 510 as described with reference to FIGS. 5 and 6.

At block 1025, the relay 135 may receive a response to the second message from the second device as described with reference to FIGS. 2-3. In certain examples, the operations of block 1025 may be performed by the relay initiation module 510 as described with reference to FIGS. 5 and 6.

Figure 11:
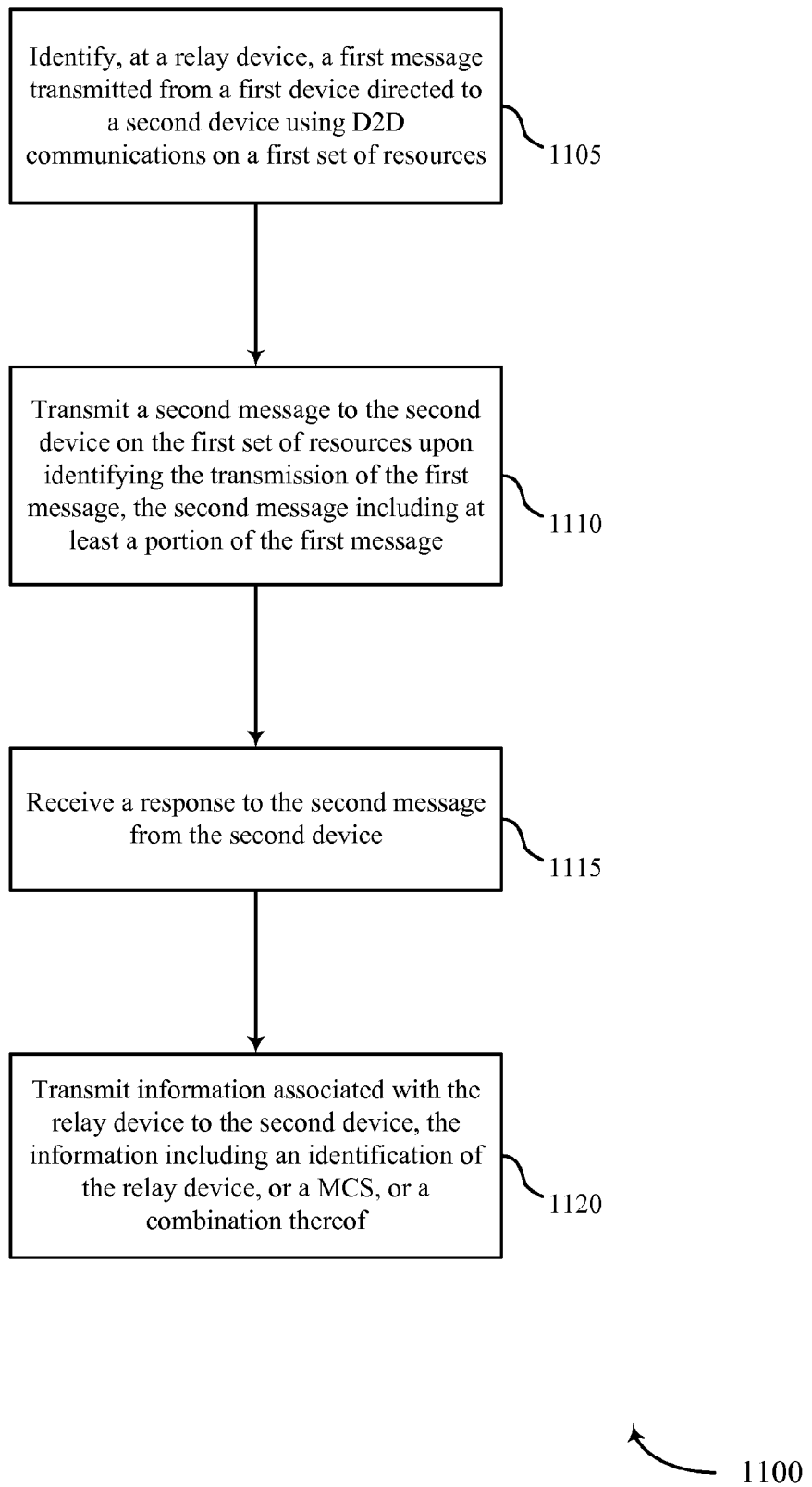

FIG. 11 shows a flowchart illustrating a method 1100 for introduction of powered relay for D2D communication in accordance with various aspects of the present disclosure. The operations of method 1100 may be implemented by a relay 135 or its components as described with reference to FIGS. 1-7. For example, the operations of method 1100 may be performed by the relay management module 410 as described with reference to FIGS. 4-7. In some examples, a relay 135 may execute a set of codes to control the functional elements of the relay 135 to perform the functions described below. Additionally or alternatively, the relay 135 may perform aspects the functions described below using special-purpose hardware. The method 1100 may also incorporate aspects of methods 800, 900, and 1000 of FIGS. 8-10.

At block 1105, the relay 135 may identify, at a relay device, a first message transmitted from a first device directed to a second device using D2D communications on a first set of resources as described with reference to FIGS. 2-3. In certain examples, the operations of block 1105 may be performed by the link identification module 505 as described with reference to FIGS. 5 and 6.

At block 1110, the relay 135 may transmit a second message to the second device on the first set of resources upon identifying the transmission of the first message, the second message comprising at least a portion of the first message as described with reference to FIGS. 2-3. In certain examples, the operations of block 1110 may be performed by the relay initiation module 510 as described with reference to FIGS. 5 and 6.

At block 1115, the relay 135 may receive a response to the second message from the second device as described with reference to FIGS. 2-3. In certain examples, the operations of block 1115 may be performed by the relay initiation module 510 as described with reference to FIGS. 5 and 6.

At block 1120, the relay 135 may transmit information associated with the relay device to the second device, the information comprising an identification of the relay device, or a MCS, or a combination thereof as described with reference to FIGS. 2-3. In certain examples, the operations of block 1120 may be performed by the relay initiation module 510 as described with reference to FIGS. 5 and 6.

Thus, methods 800, 900, 1000, and 1100 may provide for introduction of powered relay for D2D communication. It should be noted that methods 800, 900, 1000, and 1100 describe possible implementation, and that the operations and the steps may be rearranged or otherwise modified such that other implementations are possible. In some examples, aspects from two or more of the methods 800, 900, 1000, and 1100 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and Long Term Evolution (LTE)-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 or D2D links 145 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
monitoring, at a relay device, a communication link between a first device and a second device;
identifying, at the relay device, a first message transmitted over the communication link from the first device to the second device using device-to-device (D2D) communications on a first set of resources;
determining to autonomously initiate communications assistance between the first device and the second device based at least in part on the monitoring;
transmitting a second message to the second device on the first set of resources upon identifying the transmission of the first message and prior to identifying whether a communication link between the first device and the second device has failed, the second message comprising at least a portion of the first message; and
receiving a response to the second message from the second device.

2. The method of claim 1, further comprising:
transmitting the second message to the second device at a power level that is equal to a power level used to transmit the first message to the second device.

3. The method of claim 1, further comprising:
facilitating communications between the first device and the second device.

4. The method of claim 3, wherein facilitating communications comprises at least one of:
receiving a third message from the first device and retransmitting the third message to the second device; and
receiving a fourth message from the second device and retransmitting the fourth message to the first device.

5. The method of claim 3, wherein facilitating communications between the first device and the second device is initiated by the relay device.

6. The method of claim 1, further comprising:
identifying, at the relay device, a plurality of D2D messages associated with a plurality of D2D device pairs; and
attempting to facilitate communications between the first device and the second device based at least in part on the first message, or the plurality of D2D messages, or a combination thereof.

7. The method of claim 1, further comprising:
transmitting information associated with the relay device to the second device, the information comprising an identification of the relay device and a modulation and coding scheme (MCS).

8. The method of claim 1, wherein the relay device is connected to a power grid.

9. The method of claim 1, wherein a D2D communication link is established between the first device and the second device.

10. The method of claim 1, wherein the first message is a request-to-send (RTS) message.

11. The method of claim 10, wherein the response is a clear-to-send (CTS) message.

12. The method of claim 1, wherein the response is an acknowledgment (ACK).

13. The method of claim 1, wherein the first set of resources comprises a frequency channel, or a time slot, or a coding rate, or a modulation and coding scheme (MCS), or a combination thereof.

14. An apparatus for wireless communication, comprising:
means for monitoring, at a relay device, a communication link between a first device and a second device;
means for identifying, at the relay device, a first message transmitted over the communication link from the first device to the second device using device-to-device (D2D) communications on a first set of resources;
means for determining to autonomously initiate communications assistance between the first device and the second device based at least in part on the monitoring;
means for transmitting a second message to the second device on the first set of resources upon identifying the transmission of the first message and prior to identifying whether a communication link between the first device and the second device has failed, the second message comprising at least a portion of the first message; and means for receiving a response to the second message from the second device.

15. The apparatus of claim 14, further comprising:
means for transmitting the second message to the second device at a power level that is equal to a power level used to transmit the first message to the second device.

16. The apparatus of claim 14, further comprising:
means for facilitating communications between the first device and the second device.

17. The apparatus of claim 16, wherein the means for facilitating communications comprises at least one of:
means for receiving a third message from the first device and retransmitting the third message to the second device; and
means for receiving a fourth message from the second device and retransmitting the fourth message to the first device.

18. The apparatus of claim 16, wherein facilitating communications between the first device and the second device is initiated by the relay device.

19. The apparatus of claim 14, further comprising:
means for identifying, at the relay device, a plurality of D2D messages associated with a plurality of D2D device pairs; and
means for attempting to facilitate communications between the first device and the second device based at least in part on the first message, or the plurality of D2D messages, or a combination thereof.

20. The apparatus of claim 14, further comprising:
means for transmitting information associated with the relay device to the second device, the information comprising an identification of the relay device and a modulation and coding scheme (MCS).

21. The apparatus of claim 14, wherein the relay device is connected to a power grid.

22. The apparatus of claim 14, wherein a D2D communication link is established between the first device and the second device.

23. The apparatus of claim 14, wherein the first message is a request-to-send (RTS) message.

24. The apparatus of claim 23, wherein the response is a clear-to-send (CTS) message.

25. The apparatus of claim 14, wherein the response is an acknowledgment (ACK).

26. The apparatus of claim 14, wherein the first set of resources comprises a frequency channel, or a time slot, or a coding rate, or a modulation and coding scheme (MCS), or a combination thereof.

27. An apparatus for wireless communication, comprising:
a processor;
memory in electronic communication with the processor; and
instructions stored in the memory and operable, when executed by the processor, to cause the apparatus to:
monitor, at a relay device, a communication link between a first device and a second device;
identify, at the relay device, a first message transmitted over the communication link from the first device to the second device using device-to-device (D2D) communications on a first set of resources;
determine to autonomously initiate communications assistance between the first device and the second device based at least in part on the monitoring;
transmit a second message to the second device on the first set of resources upon identifying the transmission of the first message and prior to identifying whether a communication link between the first device and the second device has failed, the second message comprising at least a portion of the first message; and
receive a response to the second message from the second device.

28. The apparatus of claim 27, wherein the instructions are operable to cause the apparatus to:
transmit the second message to the second device at a power level that is equal to a power level used to transmit the first message to the second device.

29. The apparatus of claim 27, wherein the instructions are operable to cause the apparatus to:
facilitate communications between the first device and the second device.

30. The apparatus of claim 29, wherein facilitating communications comprises at least one of:
receiving a third message from the first device and retransmitting the third message to the second device; and
receiving a fourth message from the second device and retransmitting the fourth message to the first device.

31. The apparatus of claim 29, wherein facilitating communications between the first device and the second device is initiated by the relay device.

32. The apparatus of claim 27, wherein the instructions are operable to cause the apparatus to:
identify, at the relay device, a plurality of D2D messages associated with a plurality of D2D device pairs; and
attempt to facilitate communications between the first device and the second device based at least in part on the first message, or the plurality of D2D messages, or a combination thereof.

33. The apparatus of claim 27, wherein the instructions are operable to cause the apparatus to:
transmit information associated with the relay device to the second device, the information comprising an identification of the relay device and a modulation and coding scheme (MCS).

34. The apparatus of claim 27, wherein the relay device is connected to a power grid.

35. The apparatus of claim 27, wherein a D2D communication link is established between the first device and the second device.

36. The apparatus of claim 27, wherein the first message is a request-to-send (RTS) message.

37. The apparatus of claim 36, wherein the response is a clear-to-send (CTS) message.

38. The apparatus of claim 27, wherein the response is an acknowledgment (ACK).

39. The apparatus of claim 27, wherein the first set of resources comprises a frequency channel, or a time slot, or a coding rate, or a modulation and coding scheme (MCS), or a combination thereof.

40. A non-transitory computer-readable medium storing code for wireless communication, the code comprising instructions executable to:
monitor, at a relay device, a communication link between a first device and a second device;
identify, at the relay device, a first message transmitted over the communication link from the first device to the second device using device-to-device (D2D) communications on a first set of resources;
determine to autonomously initiate communications assistance between the first device and the second device based at least in part on the monitoring;
transmit a second message to the second device on the first set of resources upon identifying the transmission of the first message and prior to identifying whether a communication link between the first device and the second device has failed, the second message comprising at least a portion of the first message; and
receive a response to the second message from the second device.

41. The non-transitory computer-readable medium of claim 40, wherein the instructions are executable to:
transmit the second message to the second device at a power level that is equal to a power level used to transmit the first message to the second device.

42. The non-transitory computer-readable medium of claim 40, wherein the instructions are executable to:
facilitate communications between the first device and the second device.

43. The non-transitory computer-readable medium of claim 42, wherein facilitating communications comprises at least one of:
receiving a third message from the first device and retransmitting the third message to the second device; and
receiving a fourth message from the second device and retransmitting the fourth message to the first device.

44. The non-transitory computer-readable medium of claim 42, wherein facilitating communications between the first device and the second device is initiated by the relay device.

45. The non-transitory computer-readable medium of claim 40, wherein the instructions are executable to:
identify, at the relay device, a plurality of D2D messages associated with a plurality of D2D device pairs; and
attempt to facilitate communications between the first device and the second device based at least in part on the first message, or the plurality of D2D messages, or a combination thereof.

46. The non-transitory computer-readable medium of claim 40, wherein the instructions are executable to:
transmit information associated with the relay device to the second device, the information comprising an identification of the relay device and a modulation and coding scheme (MCS).

47. The non-transitory computer-readable medium of claim 40, wherein the relay device is connected to a power grid.

48. The non-transitory computer-readable medium of claim 40, wherein a D2D communication link is established between the first device and the second device.

49. The non-transitory computer-readable medium of claim 40, wherein the first message is a request-to-send (RTS) message.

50. The non-transitory computer-readable medium of claim 49, wherein the response is a clear-to-send (CTS) message.

51. The non-transitory computer-readable medium of claim 40, wherein the response is an acknowledgment (ACK).

52. The non-transitory computer-readable medium of claim 40, wherein the first set of resources comprises a frequency channel, or a time slot, or a coding rate, or a modulation and coding scheme (MCS), or a combination thereof.

* * * * *